US008245939B2

(12) United States Patent
Call et al.

(10) Patent No.: US 8,245,939 B2
(45) Date of Patent: *Aug. 21, 2012

(54) INVESTING FUNDS FROM PRE-PAID PAYMENT ACCOUNTS

(75) Inventors: William Call, Afton, WY (US); Kristen Call, Mesa, AZ (US); Clayton Field Call, Roy, UT (US)

(73) Assignee: Ifuel LLC, Afton, WY (US)

( * ) Notice: Subject to any disclaimer, the term of this patent is extended or adjusted under 35 U.S.C. 154(b) by 286 days.

This patent is subject to a terminal disclaimer.

(21) Appl. No.: 12/563,863

(22) Filed: Sep. 21, 2009

(65) Prior Publication Data
US 2010/0063939 A1 Mar. 11, 2010

Related U.S. Application Data

(63) Continuation-in-part of application No. 12/560,112, filed on Sep. 15, 2009, which is a continuation-in-part of application No. 11/333,956, filed on Jan. 18, 2006, now Pat. No. 7,600,692, which is a continuation-in-part of application No. 11/064,276, filed on Feb. 23, 2005, now Pat. No. 7,478,747.

(60) Provisional application No. 60/548,066, filed on Feb. 26, 2004.

(51) Int. Cl.
G06K 13/00 (2006.01)
G06K 13/24 (2006.01)

(52) U.S. Cl. ........ 235/483; 235/375; 235/379; 235/380; 705/69; 705/77

(58) Field of Classification Search .................. 235/483, 235/379, 375, 380, 381, 487; 705/39, 44, 705/72–79, 69
See application file for complete search history.

(56) References Cited

U.S. PATENT DOCUMENTS

| 5,329,589 A | 7/1994 | Fraser et al. |
| 5,790,790 A | 8/1998 | Smith et al. |
| 5,826,241 A | 10/1998 | Stein et al. |
| 6,029,150 A | 2/2000 | Kravitz |
| 6,192,407 B1 | 2/2001 | Smith et al. |
| 6,227,447 B1 | 5/2001 | Campisano |
| 6,351,739 B1 | 2/2002 | Egendorf |
| 6,882,900 B1 | 4/2005 | Terranova |

(Continued)

FOREIGN PATENT DOCUMENTS
EP 1167278 1/2002

OTHER PUBLICATIONS

U.S. Appl. No. 60/295,984, filed Jun. 5, 2001, Dobson.

(Continued)

Primary Examiner — Edwyn Labaze
(74) Attorney, Agent, or Firm — Workman Nydegger

(57) ABSTRACT

The present invention extends to methods, systems, and computer program products for investing funds from pre-paid payment accounts. Funds from accounts within a payment system are invested on behalf of account holders of the accounts. Funds are invested in accordance with a risk strategy defined for the payment system (e.g. defining investment amounts and financial assets for investment). Payments and/or gains from invested funds are disbursed to the accounts of the account holders. Payments and/or gains are disbursed in accordance with disbursement rules for the payment system (e.g., based on percentages).

20 Claims, 9 Drawing Sheets

U.S. PATENT DOCUMENTS

| | | | |
|---|---|---|---|
| 6,976,008 | B2 | 12/2005 | Egendorf |
| 7,082,406 | B1 | 7/2006 | Dickson |
| 7,103,577 | B2 | 9/2006 | Blair et al. |
| 7,309,003 | B2 | 12/2007 | Algiene et al. |
| 7,478,747 | B2 | 1/2009 | Call et al. |
| 7,600,692 | B2 | 10/2009 | Call et al. |
| 2002/0194122 | A1 | 12/2002 | Knox et al. |
| 2003/0197060 | A1 | 10/2003 | Coyner |
| 2003/0220835 | A1 | 11/2003 | Barnes, Jr. |
| 2004/0172350 | A1* | 9/2004 | Atkinson et al. ............ 705/35 |
| 2004/0200897 | A1 | 10/2004 | Demere |
| 2004/0225605 | A1 | 11/2004 | Rowe |
| 2005/0182681 | A1 | 8/2005 | Bruskotter et al. |
| 2005/0187841 | A1 | 8/2005 | Grear et al. |
| 2006/0155617 | A1* | 7/2006 | Dasilva ...................... 705/30 |
| 2007/0118449 | A1* | 5/2007 | De La Motte ............... 705/35 |

OTHER PUBLICATIONS

U.S. Appl. No. 10/162,050, filed Jun. 4, 2002, Dobson.
U.S. Appl. No. 12/560,112, filed Sep. 15, 2009, Call et al.
BP Amoco to Launch Net-Ready Gas Pumps,: ComputerWorld, Jul. 31, 2000, 3 pages.
"BP Launches Unmatched Innovation at Retails Sites," BP Press Office, Jul. 24, 2000, 2 pages.
"United States," BP website, date unknown, 2 pages.
"Driving Sales at the Pump," National Petroleum News, Jan. 2001, 11 pages.
"Rewarding Loyalty," National Petroleum News, May 2001, 7 pages.
"QuikTrip, CashWorks Team to Roll Out New Kiosk," Convenience Store News, May 4, 2005, 2 pages.
Office Action from related Canadian Application No. 2,498,473 dated Dec. 7, 2009.
U.S. Appl. No. 12/560,112, Apr. 28, 2011, Office Action.
U.S. Appl. No. 12/560,112, Oct. 6, 2011, Notice of Allowance.
U.S. Appl. No. 11/333,956, Jan. 16, 2009, Office Action.
U.S. Appl. No. 11/333,956, Jun. 5, 2009, Notice of Allowance.
U.S. Appl. No. 11/064,276, Aug. 10, 2007, Office Action.
U.S. Appl. No. 11/064,276, May 14, 2008, Office Action.
U.S. Appl. No. 11/064,276, Sep. 29, 2008, Notice of Allowance.

* cited by examiner

INVESTING FUNDS FROM PRE-PAID PAYMENT ACCOUNTS

CROSS-REFERENCE TO RELATED APPLICATIONS

The present application is a continuation-in-part of U.S. patent application Ser. No. 12/560,112, filed Sep. 15, 2009, and entitled "Payments Using Pre-Paid Accounts, which is a continuation-in-part of U.S. patent application Ser. No. 11/333,956, filed Jan. 18, 2006, and entitled "Systems and Methods for Managing and Using Prepaid Purchasing Accounts", which is a continuation-in-part of U.S. patent application Ser. No. 11/064,276, now U.S. Pat. No. 7,478,747, filed Feb. 23, 2005 and entitled "Retail Sales and Dispensing Fuel Management System," which claims priority to U.S. Provisional Patent Application Ser. No. 60/548,066, filed Feb. 26, 2004, and entitled "Fuel Marketing System". Each of the above-listed patent applications and provisional patent applications are herein incorporated by reference in their entirety.

BACKGROUND

Background and Relevant Art

There are, today, essentially four commonly-accepted methods of payment: cash, checks, credit cards, and debit cards used for making purchases. Each of these is limited, at least to some extent, to use in certain circumstances. Cash is often used when making small purchases in person; checks are used when sending payments through the mail; credit cards are convenient forms of payment for travel and online purchases, and debit cards often take the place of checks when making regular purchases, e.g., at gas stations and supermarkets. Thus, each of these payment types is useful in certain situations. However, no one form of payment is optimal in all cases.

Considerable expense and inconvenience are incurred by both consumers and businesses because of the number of traditional payment forms and because of the limited use and inefficiencies inherent in each of them.

All four traditional payment forms share the disadvantage that they are subject to theft and loss. Cash and cards can be stolen and checks expose the user's account information to persons who then can use the information to make illegal purchases. Credit card numbers can be stolen by information thieves and computer system hackers. Another disadvantage that all four traditional forms of payment share is that, as stated, no one payment form is applicable in all cases. Users must have available multiple payment forms to meet a variety of payment needs.

Consumers who use credit cards are subject to late fees and interest charges if they miss a payment deadline and are charged a high rate of interest if they make monthly payments on balances. Consumers who make online purchases must set up a separate account and have a unique username and password for each online merchant. Debit card users may have funds in their checking account tied up for several days while a transaction is being completed.

Traditional payment forms can be expensive and inconvenient for merchants. Cash is subject to theft, costly to handle, and must be taken to a bank to be deposited. Checks may be returned due to insufficient funds, are costly to handle, can be forged, must be deposited in a bank, and take several days to clear. To accept credit and debit cards a merchant must purchase special equipment, pay monthly charges, deal with chargebacks in the case of fraud or irregularities, wait several days for transactions to clear, accept a complex array of card types, and pay expensive and often unpredictable transaction fees.

Businesses and retail stores must have policies and procedures in place to deal with a wide variety of issues relating to the varied forms of payment they accept. Administrative and labor costs are multiplied by the complexities that result from a variety of payment forms.

Bank tellers spend a large percentage of their time exchanging one form of payment for another. They exchange checks for cash and accept cash to be deposited into a checking account so that checks can be written on the account. They accept checks to be deposited so the user can make purchases using a debit card. They issue cash advances to customers on credit card accounts. In addition, cards can be used to obtain cash at and cash can be deposited in an ATM machine.

Thus, traditional forms of payment are problematic at least because 1) no one payment form is universal and therefore a variety of payment forms is necessary, 2) they are tangible in form which makes them subject to theft, and 3) have inherent costs, fees, and risks that make them expensive and inefficient.

Added to the above-stated disadvantages of traditional methods of payment is the control that banks have over the funds that are temporarily held in accounts for the purpose of making payments. Although banks are expected to hold money, their control of the funds used to make payments diminishes the buying power of the funds. The same amount of money has more value to the payer if the funds used to make payments are controlled by the party to whom payment is to be made rather than by a bank.

There are a number of reasons that funds controlled by someone other than the party to whom payments are made diminishes the buying power of the funds. When a payment is made from funds controlled by others than the business that receives that payment there is limited, if any, assurance the funds will be credited to the business's account without strings attached by the others that control the funds prior to transfer. Additionally, funds controlled by others are not always immediately credited to a business upon completion of a transaction. For example, there is often some float or waiting time created by the lag or interval between the time a payment is made and the time the business receives payment. Further, a business loses any potential gain that could result from the business investing funds held for payment. For example, the business can lose interest income that could otherwise be earned by investing the funds.

BRIEF SUMMARY

The present invention extends to methods, systems, and computer program products for investing funds from pre-paid payment accounts. In some embodiments, a plurality of businesses join together to form an association of businesses. The business association has access to and controls a payment system for its members in accordance with by-laws that govern the business association and license agreements permitting the use of the system. The by-laws define the operating characteristics of the payment system, including transfer rules and investment rules. Transfer rules govern how funds can be transferred into and out of the payment system and how funds can be transferred between accounts within the payment system. Investment rules govern risk strategies for investing funds from the payment system in other investments and disbursement rules indicating how funds resulting from investment gains are to be disbursed within the payment system. Others interested in doing business with the business association (e.g., individuals or non-member businesses) can create, fund, and utilize pre-paid accounts within the payment system in accordance with the by-laws.

Funds under the control of a business association (even funds in non-member's accounts) can be used to benefit association members. In some embodiments, funds within a payment system are used to provide an investment benefit to members of a business association. A payment system identifies any sub-accounts having funds that are available for investment. The balance of each identified sub-account is determined. An amount of funds for investment is calculated based on the balances in each sub-account and in accordance with a risk strategy defined in investment rules that govern investing for the business association.

A financial module in the payment system and a payment system account at a clearing bank interoperate to invest the calculated amount of funds on behalf of the business association in accordance with the risk strategy. The financial module and the payment system account then interoperate to disburse any investment gains resulting from investing the calculated amount of funds to the sub-accounts of members of the business association. The investment gains are disbursed to the sub-accounts of the members of the business association in accordance with disbursement rules defined in the investment rules.

In some embodiments, non-member sub-accounts are debited to provide funds for investing on behalf of members of a business association. In these embodiments, the disbursement rules define that non-member sub-accounts are credited back the amount of funds originally debited and that member sub-accounts are credited with any funds resulting from investment payments and/or gains.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
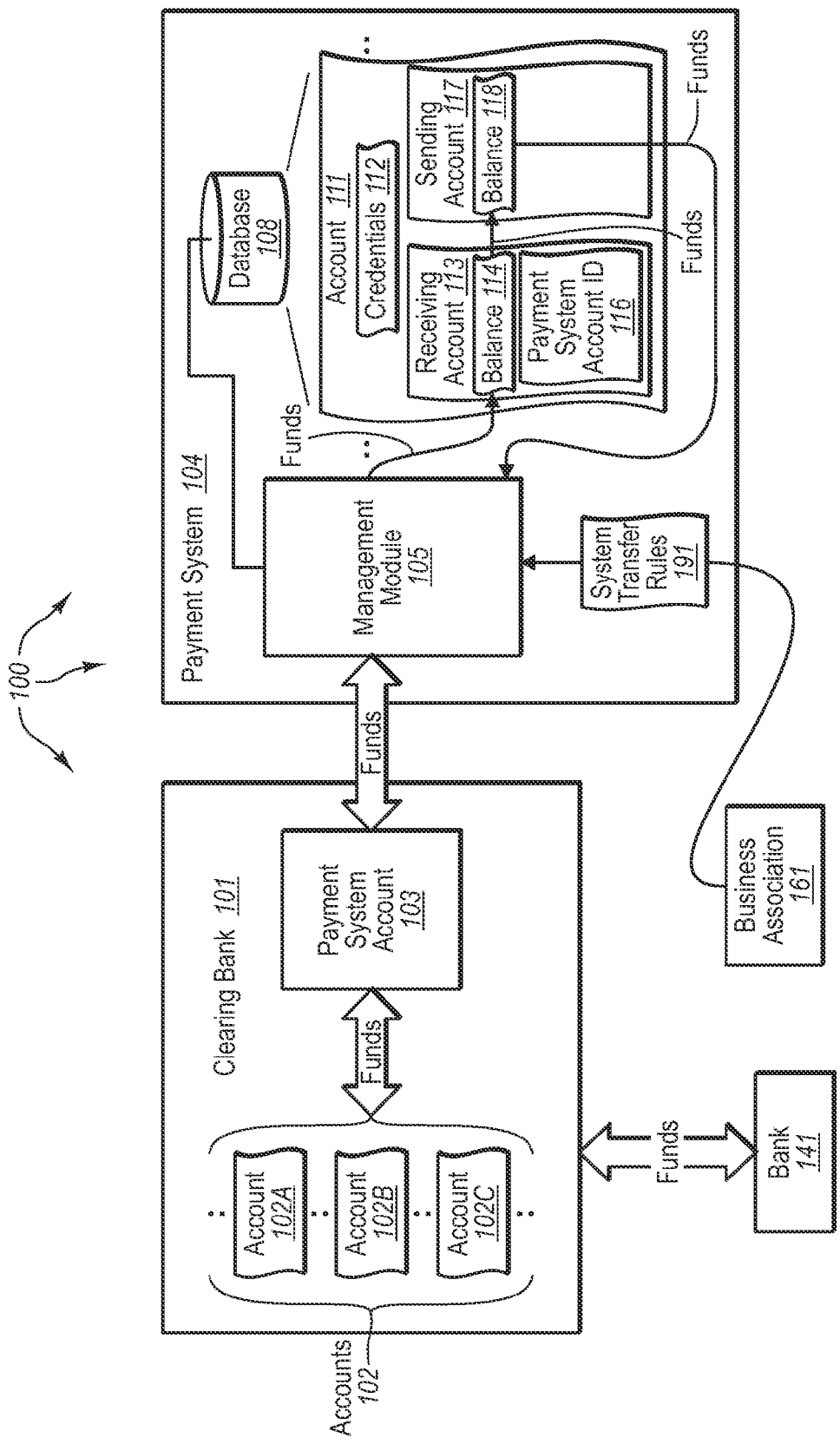
FIG. 1A illustrates an example computer architecture that facilitates making payments using pre-paid accounts.

The present invention extends to methods, systems, and computer program products for investing funds from pre-paid payment accounts. In some embodiments, a plurality of businesses join together to form an association of businesses. The business association has access to and controls a payment system for its members in accordance with by-laws that govern the business association and license agreements permitting the use of the system. The by-laws define the operating characteristics of the payment system, including transfer rules and investment rules. Transfer rules govern how funds can be transferred into and out of the payment system and how funds can be transferred between accounts within the payment system. Investment rules govern risk strategies for investing funds from the payment system in other investments and disbursement rules indicating how funds resulting from investment gains are to be disbursed within the payment system. Others interested in doing business with the business association (e.g., individuals or non-member businesses) can create, fund, and utilize pre-paid accounts within the payment system in accordance with the by-laws.

Funds under the control of a business association (even funds in non-member's accounts) can be used to benefit association members. In some embodiments, funds within a payment system are used to provide an investment benefit to members of a business association. A payment system identifies any sub-accounts having funds that are available for investment. The balance of each identified sub-account is determined. An amount of funds for investment is calculated based on the balances in each sub-account and in accordance with a risk strategy defined in investment rules that govern investing for the business association.

A financial module in the payment system and a payment system account at a clearing bank interoperate to invest the calculated amount of funds on behalf of the business association in accordance with the risk strategy. The financial module and the payment system account then interoperate to disburse any investment gains resulting from investing the calculated amount of funds to the sub-accounts of members of the business association. The investment gains are disbursed to the sub-accounts of the members of the business association in accordance with disbursement rules defined in the investment rules.

In some embodiments, non-member sub-accounts are debited to provide funds for investing on behalf of members of a business association. In these embodiments, the disbursement rules define that non-member sub-accounts are credited back the amount of funds originally debited and that member sub-accounts are credited with any funds resulting from investment payments and/or gains.

Embodiments of the present invention may comprise or utilize a special purpose or general-purpose computer including computer hardware, such as, for example, processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or transfer desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations that include one or more processors and system memory, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and in the following claims, "funds" are generally defined as highly liquid assets including, but not limited to, types of currency issued by sovereign nations (or "real currency"), such as, for example, United States Dollars, European Union Euros, Japanese Yen, British Pounds, Chinese Yuan, Swiss Francs, etc. Currency is also further defined to include "online virtual currency" used in virtual economies (sometimes referred to as synthetic economies) for exchanging virtual goods. Virtual economies include virtual persistent worlds, such as, for example, Internet games. Embodiments of the invention can also be used in secondary markets that include exchanges for exchanging real currency for virtual currency and vice versa.

Within this description and in the following claims, "investments" and "investing" are defined as a commitment of funds by buying and a recovery of funds by selling other, potentially less liquid, financial assets, such as, for example, in money markets, capital markets, derivative markets and commodity markets or even other-the-counter ("OTC"). Financial assets have different asset classes including (e.g., long term and short term) debt and equity. Asset classes can include different types of financial instruments including cash instruments and derivative instruments. Cash instruments have values determined by a market. Cash instruments include (both registered and unregistered) securities (e.g., stocks, bonds, treasure bills, commercial paper, etc.) and other cash instruments (e.g., loans, deposits, certificates of deposit, etc.). Derivative instruments are financial instruments which derive their value from the value and characteristics of one or more underlying assets. Derivative instruments can be traded at exchanges or OTC and can include futures, options, forwards, and swaps.

FIG. 1A illustrates an example computer architecture 100 of a payment system that facilitates transferring funds using pre-paid accounts. Referring to FIG. 1A, computer architecture 100 includes clearing bank 101, payment system 104, bank 141, and business association 161. Generally, clearing bank 101, payment system 104, and business association 161 cooperate with one another to implement the principles of the present invention. Clearing bank 101, business association 161, payment system 104, and bank 141 (as well as other financial institutions) can be connected to one another over (or be part of) a network, such as, for example, a Local Area Network ("LAN"), a Wide Area Network ("WAN"), and even the Internet. Accordingly, computer systems and other electronic components at clearing bank 101, payment system 104, and bank 141 (as well as other financial institutions), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), File Transfer Protocol ("FTP"), Simple Mail Transfer Protocol ("SMTP"), Simple Object Access Protocol ("SOAP"), Electronic Funds Transfer Protocol ("EFT"), etc.) over the network.

Accordingly, computer systems and other electronic components at clearing bank 101, payment system 104, and bank 141 (as well as other financial institutions) can interoperate to perform financial transactions electronically (e.g., electronic funds transfer ("EFT")). Financial transactions can include, for example, sales, refunds, withdrawals, deposits (e.g., direct deposit), cashback, inter-institution (e.g., wire) transfers (e.g., using one or more of Bank Identifier Codes ("BIC"), Swift Codes, or International Bank Account Numbers ("IBAN")), inter-account transfers, intra-account transfers, payments, etc. Generally, electronic financial transactions are encrypted and accompanied by mechanisms to authenticate a user and determine if a user is authorized to perform an indicated financial transaction.

Thus generally, as depicted in computer architecture 100, inter-institution (inter-bank) transfers can be used to transfer funds between clearing bank 101 and bank 141. Inter-institution transfers can also be used to transfer funds between clearing bank 101 and other financial institutions. As depicted, clearing bank 101 includes accounts 102 and payment system account 103. Accounts 102 can include a plurality of different user accounts, 102A, 102B, 102C, etc., for account-holders at clearing bank 101. Inter-account transfers can be used to transfer funds between accounts within clearing bank 101, such as, for example, between a checking and savings account of the same user. Inter-account transfers can be used to transfer funds between any of accounts 102 and payment system account 103.

Payment system account 103 is an account of payment system 104 at clearing bank 101. As depicted, payment system 104 includes management module 105 and database 108. Generally, management module 105 manages the creation of and access to accounts stored in database 108. For example, management module 105 can include a sign-up module (not shown) providing either a local or remote (Web based) interface for entering new account information for creating an account with payment system 105. The sign-up module can interoperate with database 108 to store newly created accounts in database 108.

Accounts stored in database 108 can be used to receive funds from other financial institutions, transfer funds between the users of payment system 104, and sending funds to other financial institutions. Each account stored in database 108 can include credentials and can be partitioned into a plurality of sub-accounts. In some embodiments, accounts in database 108 are partitioned into at least one receiving account and at least one sending account. For example, account 111 includes credentials 112 and is partitioned into receiving account 112 and sending account 117.

Business association 161 represent a plurality of merchants that have joined together to form an association of businesses. Generally, business association 161 has a license to use payment system 104. Business association 161 establishes and controls payment system 104, in accordance with the terms of a licensing agreement, for its members in accordance with by-laws that govern business association 161. The by-laws define the operating characteristics of payment system 104, including system transfer rules 191 that govern how funds can be transferred from external accounts (e.g., at other financial institutions) into the payment system, transferred between accounts within the payment system, and transferred out of the payment system to external accounts. Others interested in doing business with the members of business association 161 (e.g., individuals or non-member merchants) can create, fund, and utilize pre-paid accounts within the payment system 104 in accordance with the by-laws.

When account-holders request fund transfers involving accounts within payment system 104, management module 105 can refer to system transfer rules 191 to determine if business association 161 permits the transfer. Transfer rules in system transfer rules 191 can differ for different types of transfers, based on for example, one or more of: originating account, originating financial institution, transferring institutions, the destination account, the destination financial institution, account owner information of the originator of the transfer, account owner information of the destination account, the amount of the transfer, time of day, day of week, holidays, type of currency, membership in business association 161, etc.

Transfers between accounts within payment system 104 that have different ownership can be subject to more restrictive transfer rules. For example, with respect to accounts having different ownership, system transfer rules 191 can prohibit transfers that request funds be transferred out of (or debited from) a receiving account and/or that request funds be transferred into (or credited to) a sending account. That is, transfers between accounts with different ownership can be limited to transferring funds into (or crediting) receiving accounts and transferring funds out of (or debiting) sending accounts. For example, funds from an account at clearing bank 101, from an account at another financial institution (e.g., bank 141), or from another sending account within payment system 104, can be transferred into receiving account 113 to increase balance 114. On the other hand, funds from sending account 117 can be transferred to another receiving account within payment system 104, to an account at clearing bank 101, or to an account at another financial institution to reduce balance 118.

Transfers between accounts with payment system 104 having common ownership can be subject to less restrictive transfer rules. For example, with respect to accounts having common ownership, system transfer rules 191 can permit transfers that request funds be transferred out of (or debited from) a receiving account and/or that request funds be transferred into (or credited to) a sending account. That is, the less restrictive rules can permit a user of payment system 104 to transfer funds from a receiving account to a coupled sending account. For example, system transfer rules 191 can permit a funds transfer that debits balance 114 and credits balance 118. The account-holder for account 111 can then use the funds credited to balance 118 to send to the receiving account of other account-holders.

Transfers from other financial institutions into accounts within payment system 104 and transfer accounts within payment system 104 to other financial institutions can also be subject to transfer rules of varied restrictiveness. In some embodiments, an account identifier is used to facilitate an inter-institutional transfer crediting a receiving account. Inter-institutional transfers crediting a receiving account can be facilitated without an account holder providing credentials at and/or logging into payment system 104 (although credentials may be provided to the originating financial institution to initiate the transfer). Thus, an EFT can include an amount and the identifier for the specified receiving account. For example, to facilitate an inter-institutional transfer transferring funds into receiving account 113 (i.e., to credit balance 114), an EFT can include an amount and payment system account ID 116. An account-holder at payment system 104 can use an inter-institutional transfer to transfer funds from accounts at other financial institutions, such as, for example, at bank 101 or at bank 141, into a receiving account at payment system 104.

System transfer rules 191 can be used to prevent inter-institutional transfers that request to transfer funds out of a receiving account, even when an appropriate payment system account ID is indicated in the inter-institutional transfer.

In some embodiments, appropriate credentials are verified before permitting inter-institutional or inter-account transfers transferring funds out of a sending account or before permitting intra-account transfers. Inter-institutional and inter-account transfers out of a sending account can be facilitated by providing an amount, appropriate credentials for the sending account, and a destination account identifier (potentially including the a bank code). Upon receiving an inter-institutional or inter-account transfer, management module can verify the credentials for the sending account and verify that the balance of the sending account is sufficient. When the credentials and balance are verified, the transfer is permitted subject to system transfer rules 191.

If the destination account identifier identifies a receiving account within payment system 104, management module 105 debits the sending account and credits the identified receiving account by the amount. If the destination account identifier identifies an account at another financial institution, management module 105 transfers the amount along with an indication of the destination account identifier (and when appropriate the bank code) to clearing bank 101. Management module 105 and payment system account 103 then coordinate debiting the sending account and crediting the destination account by the amount. Thus, an account-holder at payment system 104 can use an inter-institutional transfer to transfer funds from a sending account to accounts at other financial institutions, such as, for example, at bank 101 or at bank 141 subject to system transfer rules 191. Further, within payment system 104, an inter-account transfer can also be used to transfer funds from the sending account of one account-holder to the receiving account of another account-holder subject to system transfer rules 101.

Inter-account transfers can be facilitated with or without logging into payment system 104. Messages used in EFT protocols can carry the appropriate security and transfer information to determine if a requested inter-account transfer is permitted. For example, and EFT message originating at clearing bank 101 can include sufficient information to transfer funds into receiving account 113 without the owner of account 111 having to log into payment system 104. Similar EFT messages can include sufficient information (e.g., credentials 112 or a portion thereof) to transfer funds from sending account 117 without the owner of account 111 having to log into payment system 104.

Payment system account 103 and management module 105 can interoperate to process EFT messages, implement security mechanisms, and effectuate inter-account transfers between payment system 104, bank 101, and other external financial institutions.

However, in some embodiments, account-holders log into payment system 104 to perform account management functions and facilitate transfers. An account-holder can present credentials that are verified by management module 105. For example, the account-holder of account 111 can present credentials 112 or a subset thereof (e.g., user-id and password) to gain authorized access to account 111. Management module 105 can provide a local or remote (e.g., Web based) interface permitting account-holders to interact with database 108 to administer their accounts and sub-accounts, such as, for example, to update account-holder information, to check balances, to check recent transfers, etc. The interface can also present account-holders with a list of accounts and sub-accounts the account-holder controls and options for transferring funds between controlled accounts and sub-accounts. Account-holders can use the interface to fund sending accounts from receiving accounts. In some embodiments, the interface also includes options to perform inter-account transfers from sending sub-accounts to receiving sub-accounts at payment system 104 and/or to perform inter-institutional transfers from sending sub-accounts to accounts at other financial institutions.

In some embodiments, payment system 104 and clearing bank 101 are two separate entities with prescribed interactions that can occur between them. In these embodiments, payment system 104 physically runs on one or more computer systems under the control of a separate entity (e.g., business association 161). In other embodiments, payment system 104 is part of clearing bank 101. In these embodiments, payment system 104 physically runs on one or more computer systems under the control of clearing bank 101. In further embodiments, different components of payment system 104 run on different computer systems under the control of different entities.

Figure 1B:
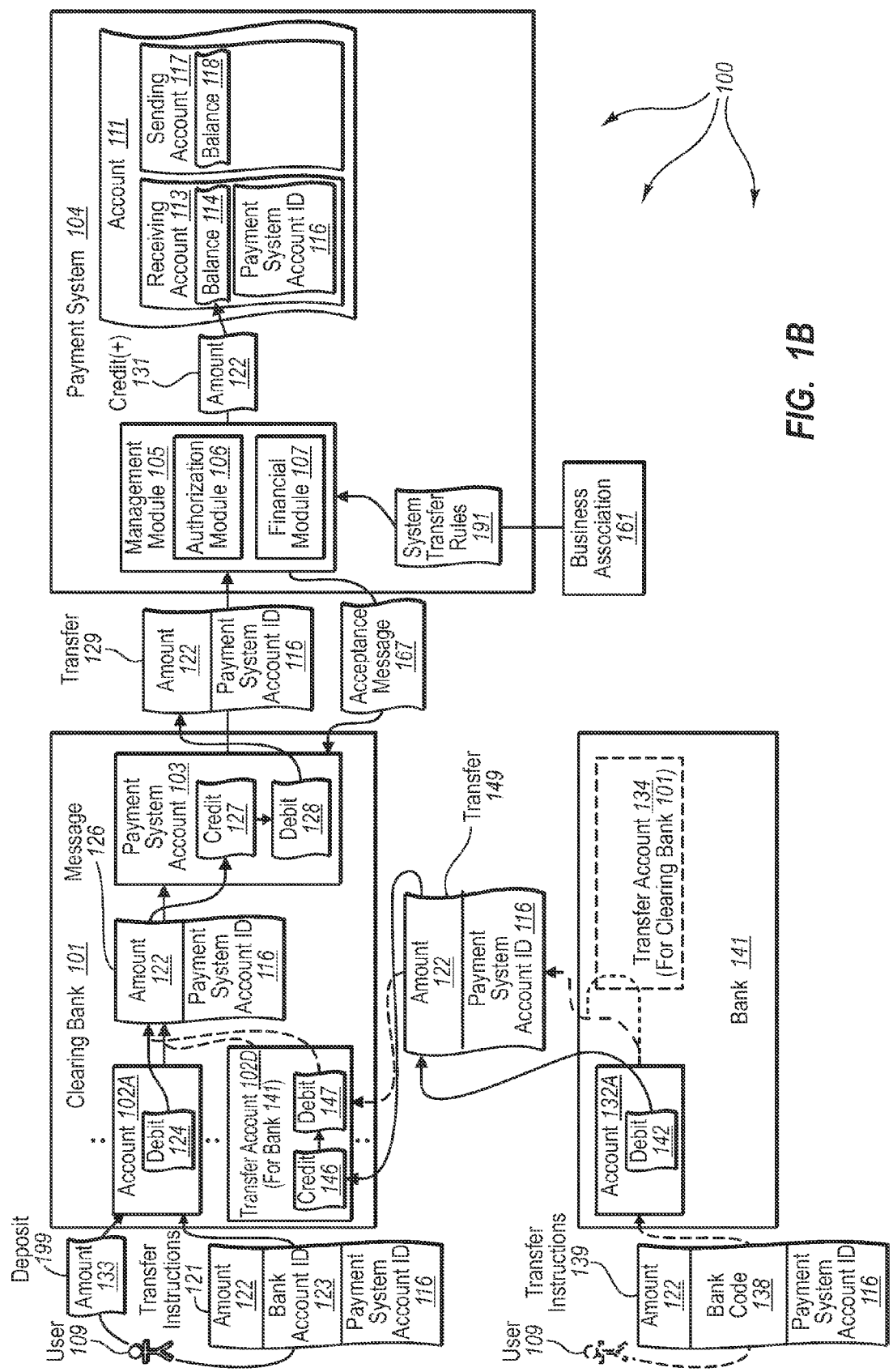
FIG. 1B illustrates a more detailed view of the computer architecture of FIG. 1A for facilitating an inter-account transfer from an external account to a receiving account within the payment system.

Turning to FIG. 1B, FIG. 1B illustrates a more detailed view of the computer architecture 100 that facilitates transferring funds from another financial institution into payment system 104. As depicted in FIG. 1B, management module 105 further includes authorization module 106 and financial module 107.

Authorization module 106 can be configured to receiving credentials, such as, for example, receiving account IDs, user-ids, password, etc., authenticate the credentials, and authorize access to accounts of payment system 104. For example, authorization module 106 can access any credentials and receiving account identifiers included in received funds transfer requests. Authorization module 106 can use one or more of authentication and authorization to determine appropriate levels of access to the at least one partitioned account based on any accessed credentials and received account identifiers. Authorization module 106 can also prevent requested fund transfers that request to alter the balance of the at least one partitioned account when accessed credentials and receiving account identifiers do not indicate a level of access sufficient for altering the balance of the at the least one partitioned account. Authorization module 106 can permit financial module 107 to transfer funds to alter the balance of the at least one partitioned account when accessed credentials and receiving account identifiers do indicate a level of access sufficient for altering the balance of the at least one partitioned account.

Financial module 107 is configured to receive locally and/or remotely entered fund transfers and interoperates with database 108 to credit and debit the balances of sub-accounts. For example, financial module 107 can access an account balance for each of at least one partitioned accounts. Financial module 107 can also alter the account balance for each of the at least one partitioned accounts by an amount indicated in the received funds transfer request.

User 109 can be an account holder (of account 102A) with clearing bank 101 and can also be an account holder (of account 111) at payment system 104. From time to time, user 109 can deposit funds into account 102A. For example, user 109 can make deposit 199 to account 102A in amount 133 (e.g., some amount of a currency, such as, dollars, euros, yen, pounds, etc.). Subsequently, user 109 may desire to fund account 111.

Thus, funds can be transferred from external financial institutions into payment system 104. For example, payment system 104 can receive transfer 129 from clearing bank 101. Transfer 129 includes amount 122 and payment system account ID 116.

Transfer 129 can be generated in a number of different ways. In some embodiments, user 109 can submit transfer instructions 121 to clearing bank 101. Transfer instructions 121 include amount 122, bank account ID 123 (an account ID for payment system account 103), and payment system account ID 116. Clearing bank 101 processes transfer instructions 121 to determine that user 109 desires to transfer amount 122 out of account 102A and into payment system account 103. Clearing bank 101 formulates message 126 including amount 122 and payment system account ID 116. To effectuate message 126, clearing bank 101 implements debit 124 to debit amount 122 from account 102A and implements credit 127 to credit amount 122 to payment system account 103.

Other embodiments of the invention including transferring funds from an external financial institution, through clearing bank 101. For example, user 109 (or another other user) may be an account-holder (of account 132) at bank 141. Clearing bank 101 and bank 141 can have linked transfer accounts (e.g., transfer account 102D and transfer account 134) that the banks utilize to transfer funds between one another. Alternately, bank 141 can implement transfers from individual user accounts to transfer account 102D without the use of corresponding linked transfer account. Within clearing bank 101, transfer account 102D can be linked to payment system account 103 such that any funds received in transfer account 102D are forwarded onto payment system account 103. Alternately, transfer account 102D is not linked to other accounts. In these embodiments, clearing bank 101 determines the destination account for a funds transfer from information included in the transfer.

User 109 can submit transfer instructions 139 to clearing bank 141. Transfer instructions 139 include amount 122, bank code 138 (e.g., a BIC, Swift code, or IBAN for clearing bank 101), and payment system account ID 116. When appropriate, transfer instructions 139 can also include bank account ID 123 to identify payment system account 103 as the destination account for amount 122. Bank 141 processes transfer instructions 139 to determine that user 109 desires to transfer amount 122 out of account 132A and to clearing bank 101. Bank 141 formulates transfer 149 including amount 122, payment system account ID 116, and, when appropriate, bank account ID 123. To effectuate transfer 149, bank 141 implements debit 142 to debit amount 122 from account 132A and sends transfer 149 (potentially through transfer account 134) to clearing bank 101.

Clearing bank 101 receives transfer 149. Clearing bank implements credit 146 to create amount 122 to transfer account 102D. Clearing bank 101 can then formulate message 126 including amount 122 and payment system account ID 116. Clearing bank 101 implements debit 147 to debit amount 122 from account 102D and implements credit 127 to credit amount 122 to payment system account 103 (using bank account ID 123 when appropriate).

Whether funds are transferred internal to clearing bank 101 or through interoperation between clearing bank 101 and an external financial institution, payment system account 103 retains payment system account ID 116 to send to payment system 103. Clearing bank 101 then implements debit 128 to debit payment system account 103 by amount 122. Clearing bank 101 formulates transfer 129 to transfer amount 122 from clearing bank 101 to payment system 104. Management module 105 then receives transfer 129.

Upon receiving transfer 129, authorization module 16 can refer to by-laws for business association 161 to determine if transfer 129 complies with system transfer rules 191. If authorization module 106 determines that transfer 129 does not comply with system transfer rules 191, financial module 107 is prevented from transferring funds. Payment system 104 can also return an error or rejection message to clearing bank 101 (propagating back to bank 141 when appropriate) indicating that transfer 129 was not allowed due to non-compliance with system transfer rules 191. On the other hand, if authorization module 106 determines that transfer 129 does comply with system transfer rules 191, financial module 107 accepts transfer 129.

Financial module 107 can then use payment system account ID 116 to identify receiving account 113. Using payment system account ID 116, financial module 107 implements credit 131 to credit balance 114 by amount 122. Since amount 122 is received in a transfer from clearing bank 101, amount 122 is essentially immediately available for use in other financial transactions. After implementing credit 131, payment system 104 can send acceptance message 167 to clearing bank 101. Payment system account 103 can receive acceptance message 167 and complete remaining work related to transfer 129.

Figure 1C:
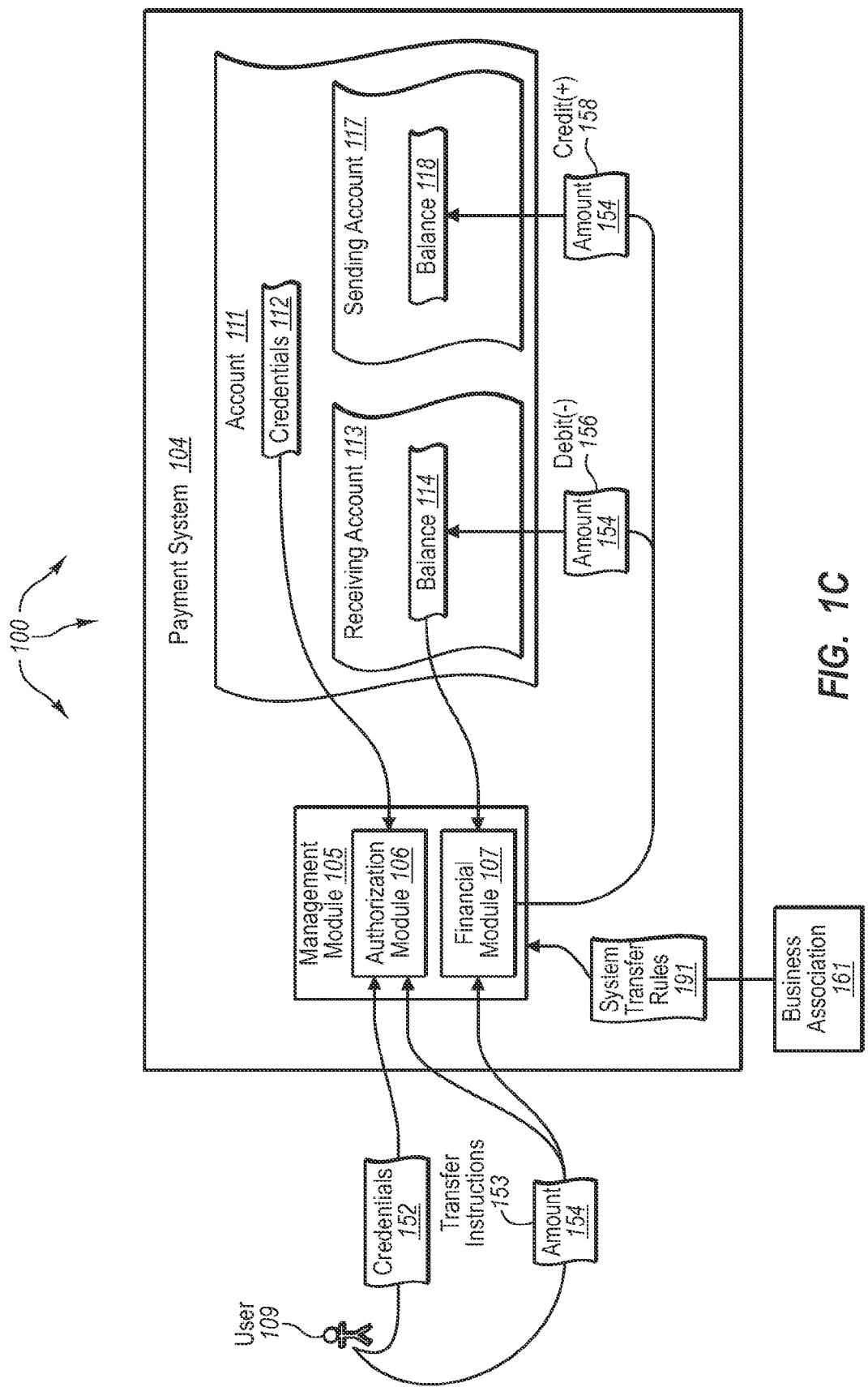
FIG. 1C illustrates a more detailed view of the payment system of FIGS. 1A and 1B for facilitating an intra-account transfer between a receiving account and a coupled sending account within the payment system.

Moving to FIG. 1C, FIG. 1C illustrates a more detailed view of payment system 104 that facilitates transferring funds from a receiving account to a coupled sending account within payment system 104. From time to time, user 109 can log into payment system 104 to transfer funds from a receiving account to a corresponding sending account. System transfer rules 191 can govern intra-system transfers within payment system 104. For example, system transfer rules 191 can place restrictions on transfers from receiving sub-accounts to sending sub-accounts. When transfers are requested, authorization module 106 can check requested transfers for compliance with system transfer rules 191. Non-compliant transfers can be prevented.

User 109 can submit credentials 152 (e.g., an account number and password) to attempt to login to payment system 104. Authorization module 106 can receive credentials 152. Authorization module 106 can determine that a portion of credentials 152 (e.g., an account number) identifies account 111. In response, authorization module can access credentials 112 and compare credentials 152 to credentials 112. When credentials 152 are appropriate for accessing account 111 (e.g., a password in credentials 152 matches a password in credentials 112), payment system 104 can present an interface to user 109.

The interface can present sub-accounts, balances, user information, etc. corresponding to account 111. For example, the interface can present balances 114 and 118. User 109 can use the interface to transfer funds from receiving account 113 to sending account 117. For example, user 109 can submit transfer instructions 153 to payment system 104 to request a funds transfer from receiving account 113 to sending account 117 in amount 154.

Authorization module 106 and financial module 107 receive transfer instructions 153. Authorization module 106 determines if the transfer 153 complies with system transfer rules 191. When transfer instructions 153 do not comply with system transfer rules 191, financial module 107 is prevented from transferring funds. Payment system 104 can also return an error or status message to user 109 indicating that transfer instructions 153 are not allowed due to non-compliance with system transfer rules 191. On the other hand, when transfer instructions 153 comply with system transfer rules 191, financial module 107 is permitted to transfer funds.

In response, financial module 107 accesses balance 114. Financial module determines if balance 114 is sufficient to implement transfer instructions 153 (e.g., is balance 114 at least equal to amount 154). When balance 114 is insufficient, financial module 107 prevents any transfers based on transfer instructions 153. Payment system 104 can also return an error or status message to user 109 indicating that balance 114 is insufficient to implement transfer instructions 153. On the other hand, when balance 114 is sufficient, financial module 107 implements a transfer in accordance with transfer instructions 153. For example, financial module 107 can essentially simultaneously implement debit 156 to debit amount 154 from balance 114 and implement credit 158 to credit amount 154 to balance 118. Accordingly, user 109 can use payment system to fund a sending account with funds from a corresponding receiving account.

Figure 1D:
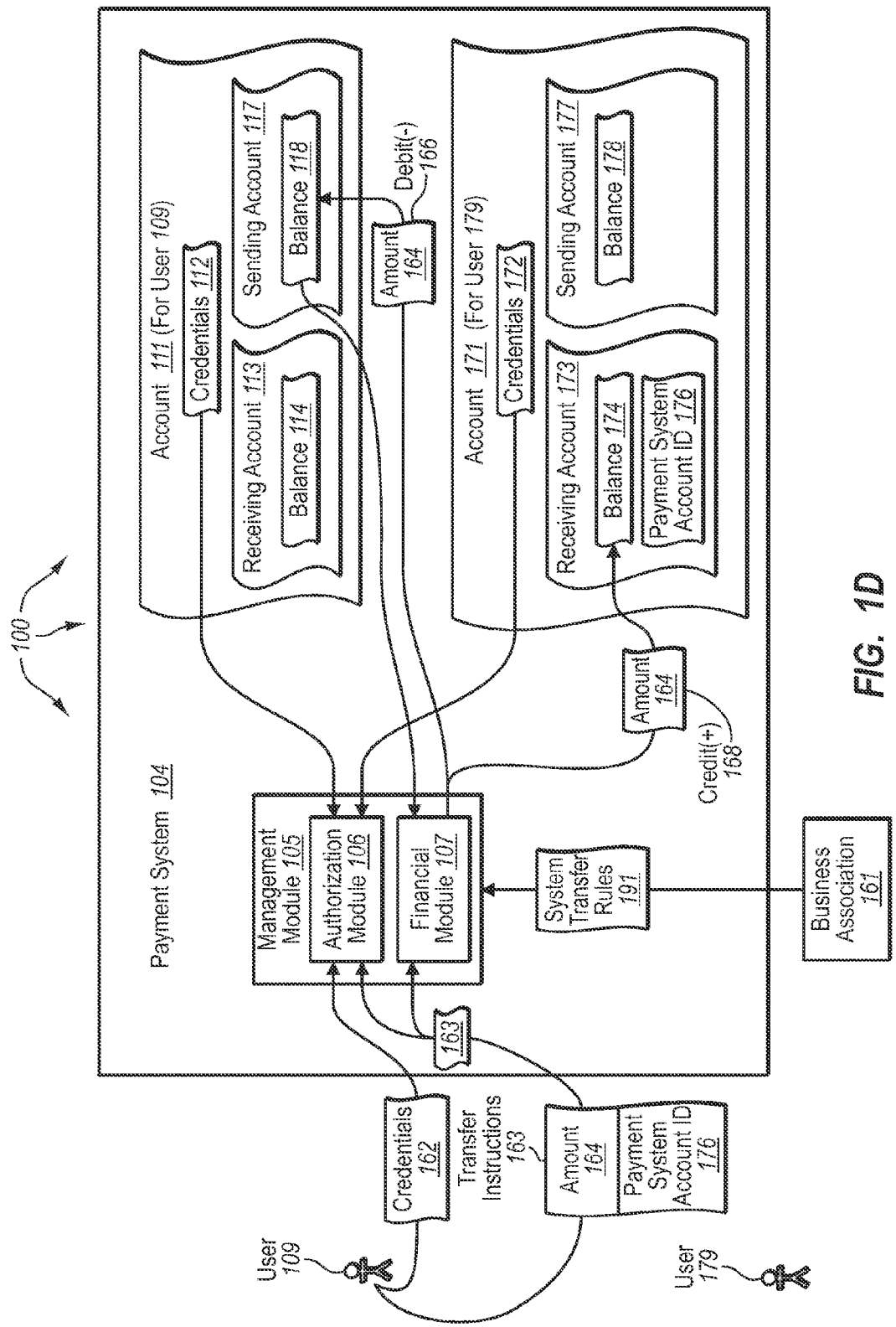
FIG. 1D illustrates a more detailed view of the payment system of FIGS. 1A and 1B for facilitating an inter-account transfer between a sending account and a receiving account within the payment system.

Turning to FIG. 1D, FIG. 1D illustrates a more detailed view of payment system 104 that facilitates transferring funds from a sending account of one user and to a receiving account of another user within the payment system. Within FIG. 1D, user 109 can be the account-holder account 111 and user 179 can be the account holder for account 171. From time to time, user 109 can log into payment system 104 to transfer funds from a sending account to a receiving account for another account-holder of payment system 104. User 109 can transfer funds to a receiving account for another account holder for any number of reasons, such as for example, to give a gift, to give a donation, to pay for items received, etc.

User 109 can submit credentials 162 (e.g., an account number and password) to attempt to login to payment system 104. Authorization module 106 can receive credentials 162. Authorization module 106 can determine that a portion of credentials 162 (e.g., an account number) identifies account 111. In response, authorization module can access credentials 112 and compare credentials 162 to credentials 112. When credentials 162 are appropriate for accessing account 111 (e.g., a password in credentials 162 matches a password in credentials 112), payment system 104 can present an interface to user 109.

Through the interface, user 109 can submit transfer instructions 163 to payment system 104 to request a funds transfer from sending account 117 to receiving account 173 in amount 164. Transfer instructions 163 also includes payment system account ID identifying receiving account 173 (a receiving sub-account for user 179).

Authorization module 106 and financial module 107 receive transfer instructions 163. Authorization module 106 determines if the transfer instructions 163 comply with system transfer rules 191. When transfer instructions 163 do not comply with system transfer rules 191, financial module 107 is prevented from transferring funds. Payment system 104 can also return an error or status message to user 109 indicating that transfer instructions 163 are not allowed due to non-compliance with system transfer rules 191. On the other hand, when transfer instructions 163 comply with system transfer rules 191, financial module 107 is permitted to transfer funds.

In response, financial module 107 accesses balance 118. Financial module determines if balance 118 is sufficient to implement transfer instructions 163 (e.g., is balance 118 at least equal to amount 164). When balance 118 is insufficient, financial module 107 prevents any transfers based on transfer instructions 163. Payment system 104 can also return an error or status message to user 109 indicating that balance 118 is insufficient to implement transfer instructions 163. On the other hand, when balance 118 is sufficient, financial module 107 implements transfer instructions 163. For example, financial module 107 can essentially simultaneously implement debit 166 to debit amount 164 from balance 118 and implement credit 168 to credit amount 164 to balance 174.

Accordingly, user 109 can use payment system 104 to transfer funds to other users of payment system 104. From the perspective of other financial institutions (e.g., clearing bank 101), the total funds within payment system 104 remains the same when funds are moved between different accounts within payment system 104. Further, since funds within payment system 104 are previously cleared funds, funds transferred within payment system 104 can be placed under immediate control of the recipient of the transferred funds.

Thus, funds can be transferred between accounts within a payment system. A request to transfer funds between accounts can be received. For example, in FIG. 1C, management module 105 can receive credentials 152 and transfer instructions 153, including amount 154, for transferring funds from receiving account 113 to sending account 117. Alternately, in FIG. 1D, management module 105 can receive credentials 162 and transfer instructions 153, including amount 164 payment system account ID 176, for transferring funds from sending account 117 to receiving account 173.

Upon receiving a request, authorization module 106 can verify security information. For example, in FIG. 1C, authorization module 106 can verify credentials 152 identifying user 109 as an account holder of receiving account 113. Alternately, in FIG. 1D, authorization module 106 can verify credentials 162 identifying user 109 as an account holder of receiving account 113.

Balances can then be verified to insure that sufficient funds are available for the transfer. For example, in FIG. 1C, financial module 107 can verify that balance 114 is sufficient to transfer amount 154. Alternately, in FIG. 1D, financial module 107 can verify that balance 118 is sufficient to transfer amount 164. Business association by-laws can also be checked to determine if the requested electronic transfer of funds complies with the transfer rules that govern how funds can be transferred between accounts within payment system 104. For example, in FIG. 1C, authorization module 106 can refer to the by-laws for business association 161 to determine if transfer instructions 153 comply with system transfer rules 191. Alternately, in FIG. 1D, authorization module 106 can refer to the by-laws for business association 161 to determine if transfer instructions 163 comply with system transfer rules 191.

When a requested transfer does not comply with transfer rules the electronic request is rejected. For example, in FIG. 1C, if authorization module 106 determines that transfer instructions 153 do not comply with system transfer rules 191, payment system 104 rejects transfer instructions 153. Alternately, in FIG. 1D, if authorization module 106 determines that transfer instructions 163 do not comply with system transfer rules 191, payment system 104 rejects transfer instructions 163.

On the other hand, when a requested transfer complies with transfer rules the electronic request is accepted. For example, in FIG. 1C, if authorization module 106 determines that transfer instructions 153 do comply with system transfer rules 191, payment system 104 accepts transfer instructions 153. Alternately, in FIG. 1D, if authorization module 106 determines that transfer instructions 163 do comply with system transfer rules 191, payment system 104 accepts transfer instructions 163.

Authorization module 106 then uses the security information to identify the second account. For example, in FIG. 1C, authorization module 106 can use credentials 152 to identify sending account 117 (as both receiving account 113 and sending account 117 are both partitions of account 111). Alternately, in FIG. 1D, financial module 107 can use payment system account ID 176 to identify receiving account 173.

Financial module 107 then transfers the requested amount of funds from the first account to the second account subsequent and in response to verifying the credentials and verifying the first account balance. Transferring the requested amount of funds places the requested amount of funds under the control of the account holder of the second account essentially immediately upon completion of the transfer. For example, in FIG. 1C, financial module 107 can transfer amount 154 from receiving account 113 to sending account 117. Alternately, in FIG. 1D, financial module 107 can transfer amount 164 from sending account 117 to receiving account 173.

Transferring funds can include debiting the balance of the first account by the requested amount of funds and essentially simultaneously to debiting the balance of the first account, crediting the second account by the requested amount of funds. For example, in FIG. 1C, financial module 107 can issue debit 156 to debit amount 154 from balance 114 and essentially simultaneously to debiting balance 114, financial module 107 can issue credit 158 to credit amount 154 to balance 118. Alternately, in FIG. 1D, financial module 107 can issue debit 166 to debit amount 164 from balance 118 and essentially simultaneously to debiting balance 118, financial module 107 issue credit 168 to credit amount 164 to balance 174.

Figure 1E:
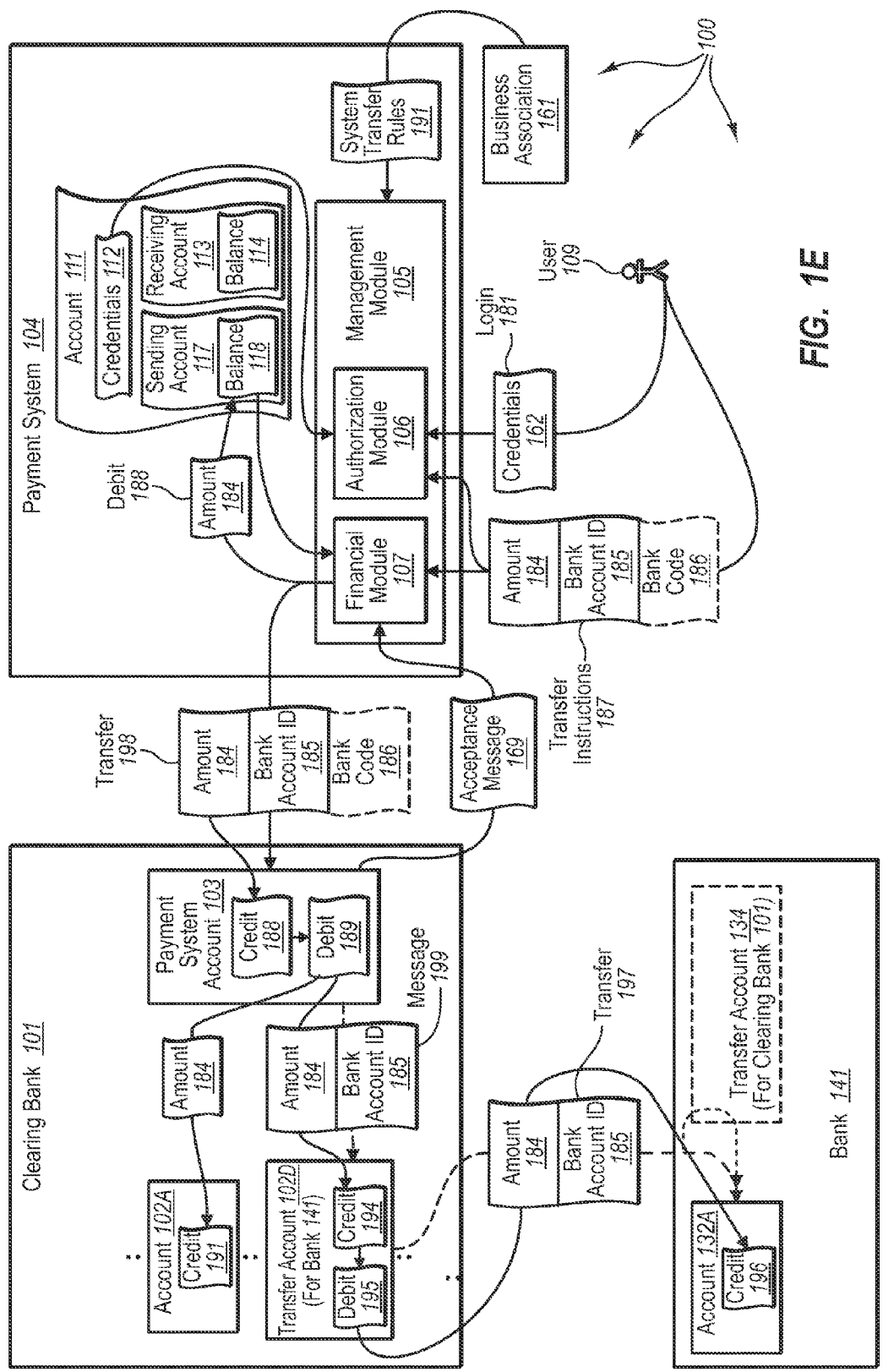
FIG. 1E illustrates a more detailed view of the computer architecture of FIG. 1A for facilitating an inter-account transfer from a sending account within the payment system to an external account.

Moving to FIG. 1E, FIG. 1E illustrates a more detailed view of computer architecture 100 that facilitates transferring funds from payment system 104 to another financial institution. From time to time, user 109 can log into payment system 104 to transfer funds from a sending account to an (e.g., banking) account at another financial institution.

Thus, funs can be transferred out of payment system 104 to another financial institution. Payment system 104 can receive an electronic request requesting an electronic transfer of funds from an account within payment system 104 to an account at another financial institution. The request can include user credentials, a receiving account identifier, and a requested amount of funds that is to be transferred For example, payment system 104 can receive credentials 182 along with transfer instructions 187, including amount 184, bank account ID 185, and optionally bank code 186. User 109 can enter credentials 162 and transfer instructions into payment system 104 to attempt to authorize a transfer from sending account 117 to an account at another financial institution. For example, through an interface, user 109 can submit transfer instructions 187 to payment system 104 to request a funds transfer from sending account 117 to account 102A (or account 132A) in amount 184. Transfer instructions 187 also includes bank account ID 185, and when appropriate, bank code 186 (e.g., a BIC, Swift code, or IBAN for bank 141).

Authorization module 106 can verify that user credentials correspond to a sending account of a user of the payment system. For example, authorization module 106 can receive credentials 182. Authorization module 106 can determine that a portion of credentials 182 (e.g., an account number) identifies account 111. In response, authorization module can access credentials 112 and compare credentials 182 to credentials 112. When credentials 182 are appropriate for accessing account 111 (e.g., a password in credentials 182 matches a password in credentials 112), payment system 104 an active an interface for user 109.

Financial module 107 verifying that the balance of the sending account is sufficient to transfer the requested amount of funds. For example, financial module 107 can verify that balance 118 is sufficient to transfer amount 184 187 (e.g., is balance 118 at least equal to amount 184). On the other hand, when balance 118 is insufficient, financial module 107 prevents any transfers based on transfer instructions 184. Payment system 104 can also return an error or status message to user 109 indicating that balance 118 is insufficient to implement transfer instructions 184.

Authorization module 106 can refer to established by-laws for the business association to determine if the requested electronic transfer of funds complies with the transfer rules that govern how funds can be transferred out of the payment system to other financial institutions. For example, authorization module 106 can refer to the by-laws for business association 161 to determine if transfer instructions 187 comply with system transfer rules 191. If authorization module 106 determines that transfer instructions 187 do not comply with system transfer rules 191, payment system 104 rejects transfer instructions 187. Payment system 104 can also return an error or status message to user 109 indicating that transfer instructions 187 do not comply with system transfer rules 191. On the other hand, if authorization module 106 determines that transfer instructions 187 do comply with system transfer rules 191, payment system 104 accepts transfer instructions 187.

Upon accepting transfer instructions 187, financial module 107 can formulate transfer 198. Transfer 198 includes amount 184, account ID 185, and when appropriate, bank code 186 (e.g., a BIC, Swift code, or IBAN for bank 141). Financial module 107 can then send transfer 198 to clearing bank 101. Clearing bank 101 receives transfer 198 and implements credit 188 to credit amount 184 to payment system account 103. Clearing bank 101 can then send acceptance message 169 back to payment system 104.

Payment system 104 can receive acceptance message 169 back from clearing bank 101 indicating that clearing bank 101 has accept transfer 198. Financial module 107 can issue debit 188 to debit amount 184 from balance 118 in response to receiving acceptance message 169. Accordingly, in some embodiments, financial module 107 can interoperate with payment system account 103 to essentially simultaneously implement debit 166 to debit amount 184 from balance 118 and send transfer 198 to clearing bank 101

When the destination account is internal to clearing bank 101, clearing bank 101 uses a bank account ID to determine the destination count for the funds. For example, clearing bank 101 can user bank account ID 185 to determine that the destination account for transfer 198 is account 102A. Clearing bank 101 can then implement debit 189 to debit payment system account 103 by amount 184 and implement credit 191 to credit account 102A by amount 184.

On the other hand, when the destination account is at a further financial institution, clearing bank uses bank code 186 to determine where to transfer amount 184. For example, clearing bank 101 can use bank code 186 to determine that the destination account is at bank 141. Clearing bank 101 formulates message 199 including amount 184 and bank account ID 185. To effectuate transfer 198, clearing bank 101 implements debit 189 to debit amount 184 from payment system account 103 and implements credit 194 to credit amount 184 to transfer account 102D.

Clearing bank 101 then sends transfer 197 including amount 184 and bank account ID 185 to bank 141. Clearing bank 101 and bank 141 then interoperate to implement debit 128 to debit transfer account 102D by amount 184 and implement credit 196 to credit account 132A by amount 184. When appropriate, transfer 197 can pass through transfer account 134 before being credited to account 132A.

Generally, funds transferred into accounts within a payment system are previously cleared funds that are placed, at least to some extent, under the control of the business association. Thus, the business association can invest funds held within the payment system for the benefit of the members of the business association.

Figure 2:
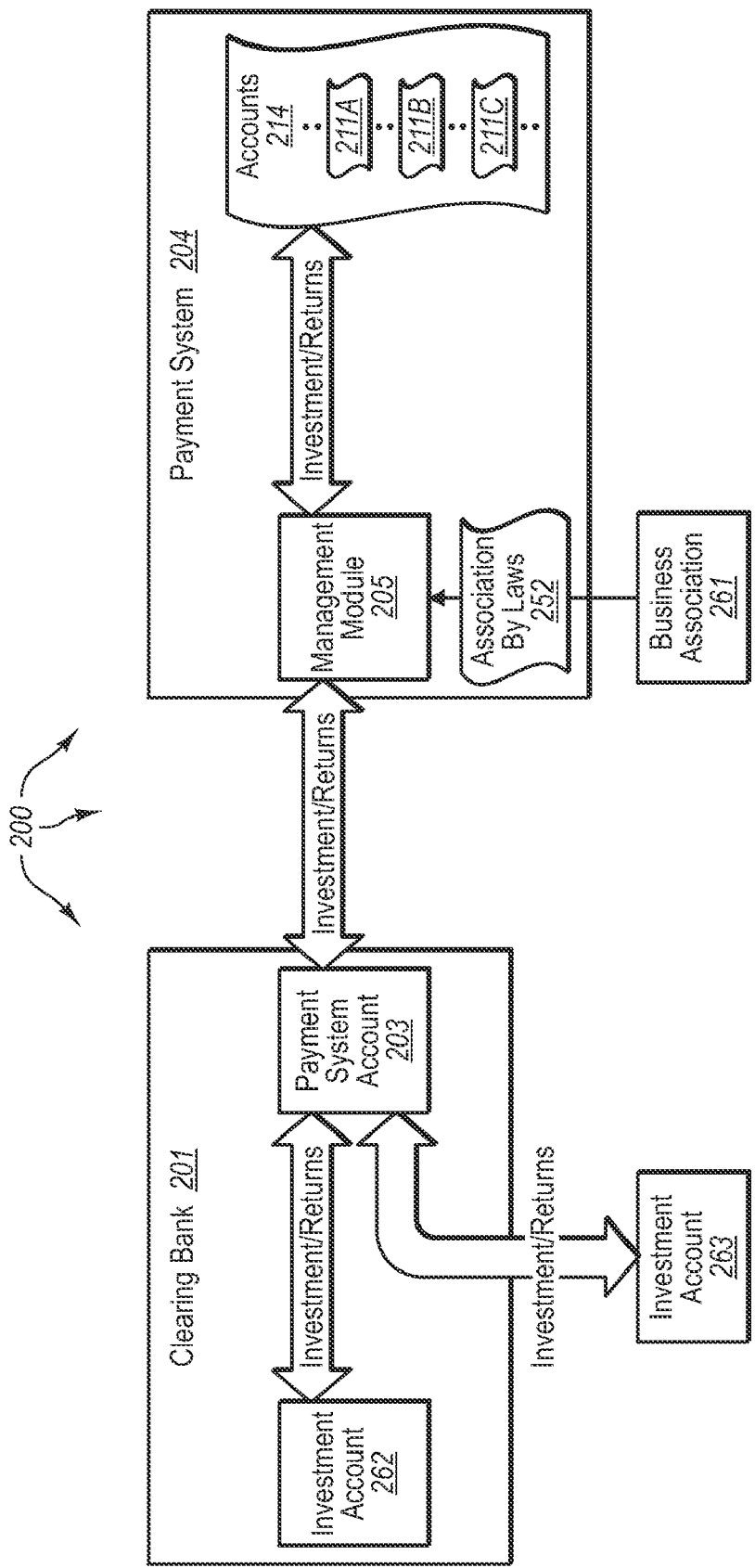
FIG. 2 illustrates an example computer architecture that facilitates making investments from and returning investment gains to accounts within a payment system.

FIG. 2 illustrates an example computer architecture 200 that facilitates making investments from and returning investment gains to accounts within a payment system. Generally, management module 205 can debit funds from accounts 211 (211A, 211B, 211C, etc.) and transfer the funds to clearing bank 201 for investment on behalf of the members of business association 261. When transferring funds to clearing bank 201, management module 205 can indicate an investment strategy in accordance with association by laws 252. An investment strategy can indicate that different amounts of funds are to be invested in different financial assets (e.g., loans, money markets, commercial paper, stocks, etc.) on behalf of the members of business association 261.

Payment system account 203 can receive funds along with an investment strategy from payment system 204. Payment system account 203 can transfer funds to internal investment accounts, such as, for example, investment account 262, and/or external investment accounts, such as, for example, investment account 263, for investment. Payment system 203 can also send appropriate instructions to each investment account to invest funds in accordance with the investment strategy in association by-laws 252. Funds in investment accounts can then be invested on behalf of the members of business association in accordance with the investment strategy in association by-laws 252.

Funds representing payments (e.g., interest) and/or other gains (e.g., capital, etc.) on invested funds can periodically be transferred from investment accounts, such as, for example, investment accounts 262 and 263, to payment system account 203. Payment system account 203 can receive funds representing payments and/or gains and can transfer these funds to payment system 204. Management module 205 receives the funds representing payments and/or gains and credits payments and/or gains among accounts 211 in accordance with association by laws 252.

Payments and gains from investments can be made periodically or at the request of business association 261. For example, interest on money market funds and on overnight investments in commercial paper may be paid monthly. An investment strategy can indicate a preference for the longest time business association 261 would have to wait to receive (e.g., interest) payments on invested funds, such as, for example, quarterly.

Figure 3:
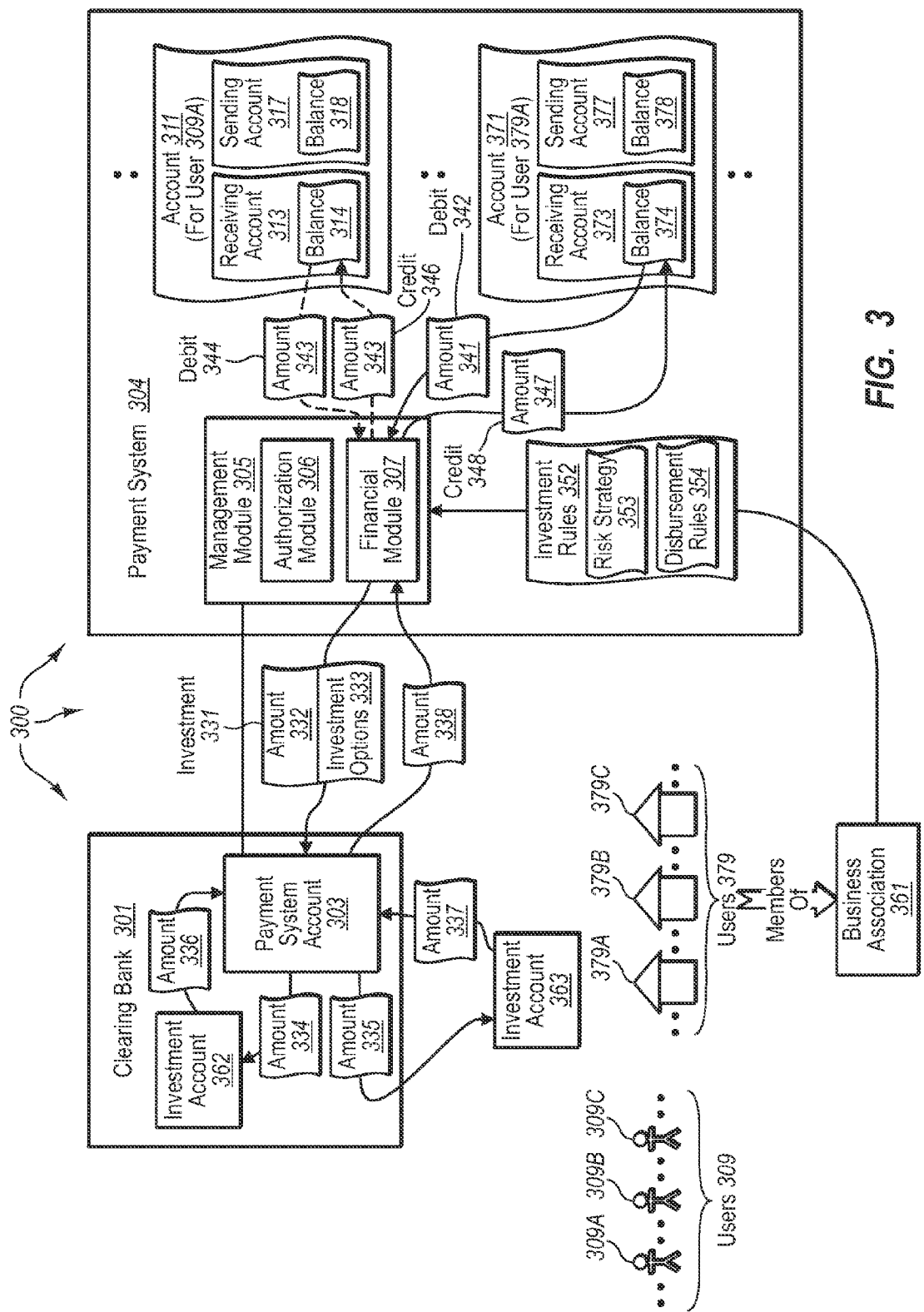
FIG. 3 illustrates an example computer architecture that facilitates providing an investment benefit to account holders of pre-paid accounts within a payment system.

Accordingly, embodiments of the invention include providing an investment benefit to account holders of pre-paid accounts within a payment system. FIG. 3 illustrates an example computer architecture 300 that facilitates providing an investment benefit to account holders of pre-paid accounts within a payment system. As depicted, users 379 (e.g., businesses) have grouped together to form business association 361, of which each of users 379 (e.g., users 379A, 379B, 379C, etc.) are members. Business association 361, through its members, can operate and maintain payment system 304 for the benefit of the members as well as for the benefit of other users 309 (e.g., potential customers of the members).

Each of users 379 can have an account within payment system 304. For example, user 379A is the account holder for account 371. Other users 309 can also have accounts within payment system 304. For example, user 309A is the account holder for account 311.

Business association 361 can establish association by-laws that govern the operation of business association 361, including payment system 304. For example, association by-laws can define investment rules 352 defining how funds from accounts in payment system 104 are to be invested. Further, as depicted, investment rules 352 also define risk strategy 353 and disbursement rules 354. Risk strategy 353 defines a risk strategy for investing funds under the control of payment system 304. Risk strategy 353 can define types of financial assets, such as, for example, loans, fixed income, registered securities, money market, commodities, etc. and amounts that can be invested in different types of investment vehicles. Disbursement rules 354 define how any payments and/or gains on invested funds are distributed among members of business association 361. In some embodiments, payments and/or gains are based on the percentage of funds in payment system 104 that are received by a member of business association 361. For example, if a business received 10% of the funds transfer from customers (non-members) during a given time period, the business would receive 10% of any payments or gains earned form inventing funds held in customer accounts.

Figure 4:
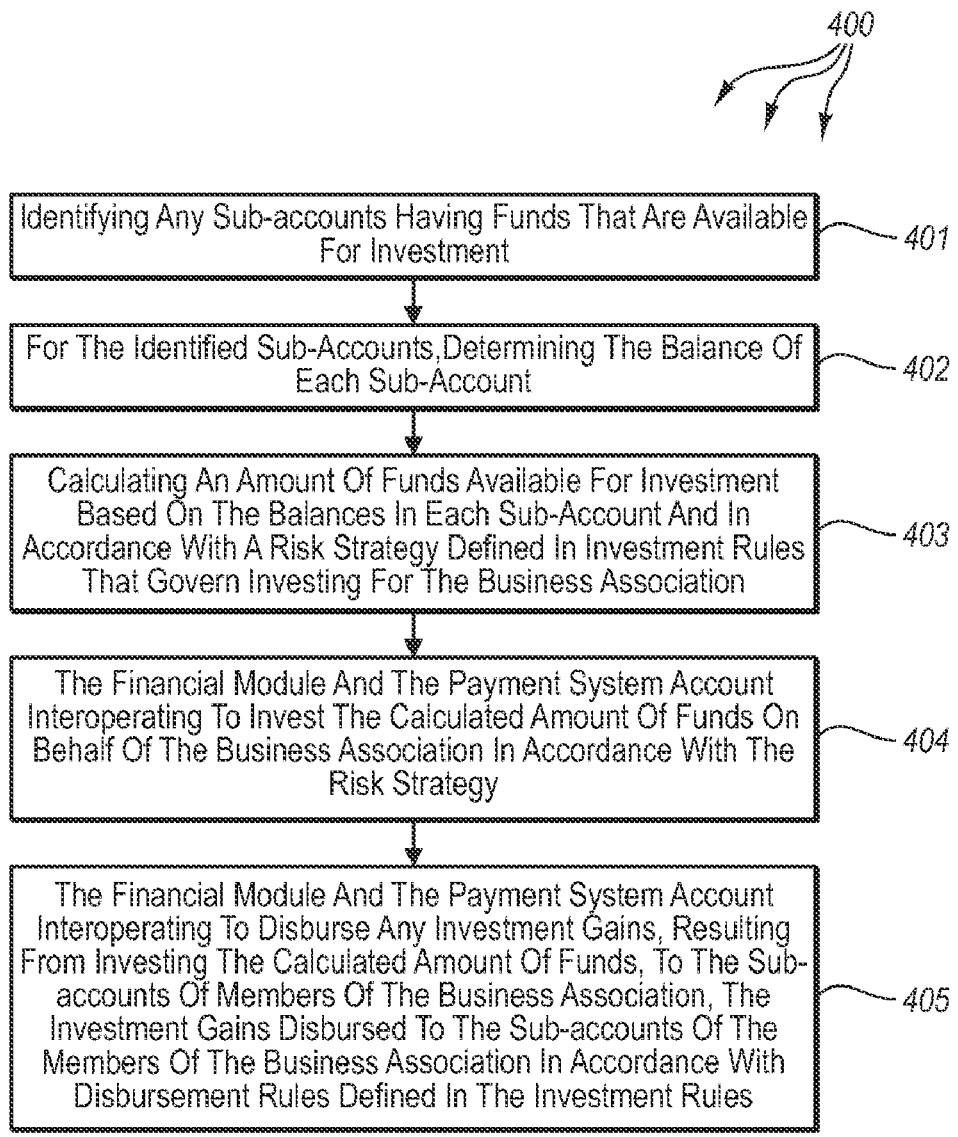
FIG. 4 illustrates a flow chart of an example method for transferring funds between registered users within the payment management system.

FIG. 4 illustrates a flow chart of an example method 400 for providing an investment benefit to payment system account holders that are members of an association of businesses. Method 400 will be described with respect to the components and data in computer architecture 300.

Method 400 includes an act of identifying any sub-accounts having funds that are available for investment (act 401). For example, financial module 307 can identify a plurality of sub-accounts, including receiving account 313 and receiving account 373, as having funds available for investment. Funds availability for investment can depend on the balance of an account and/or other factors as defined in investment rules 352. Thus, in some embodiments, funds in non-member sub-accounts (e.g., receiving account 313) are identified for investment on behalf of members of business association 361.

Method 400 includes for each of the identified sub-accounts, an act of determining the balance of each sub-account (act 402). For example, financial module 307 can determine the balance of each of the plurality of sub-accounts, including balance 314 and balance 374. Method 400 includes an act of calculating an amount of funds available for investment based on the balances in each sub-account and in accordance with a risk strategy defined in investment rules that govern investing for the business association (act 403). For example, financial module 307 can calculate amount 332 based on the balances of the plurality of sub-accounts, including balances 314 and 374, and in accordance with risk strategy 353. In some embodiments, for each identified sub-account, a portion of or less than all of the funds in a sub-account are used for investing based on the balance of the sub-account.

Method 400 includes an act of the financial module and the payment system account interoperating to invest the calculated amount of funds on behalf of the business association in accordance with the risk strategy (act 404). Financial module 107 can debit some amount of funds from each of the plurality of identified sub-accounts. For example, financial module 307 can send debit 344 to debit balance 314 by amount 343 and can send debit 342 to debit balance by amount 341. Amounts 343 and 341, along with amounts from other of the plurality of identified accounts, are combined into amount 332. Financial module 307 can track amounts debited from each of the sub-accounts.

Financial module 307 and payment system account 303 then interoperate to send investment 331 to clearing bank 301. Investment 331 includes investment amount 332 and investment options 333. Investment options 333 are selected in accordance with risk strategy 353. Clearing bank 301 then invests amount 332 as defined in investment options 333. Clearing bank 301 can invest funds 332 in internal investment accounts and/or external investment accounts. For example, clearing bank 301 can invest amount 334 in investment account 363 and amount 335 in investment account 363.

Subsequently, clearing bank 301 can retrieve or can periodically receive invested funds, payments, and/or gains, from investment accounts. For example, payment system account 303 can receive amount 336 from investment account 362 and amount 337 from investment account 363. Payment system account 303 can aggregate retrieved amounts into amount 338 (which can be greater than amount 332).

Method 400 includes an act of the financial module and the payment system account interoperating to disburse any investment gains, resulting from investing the calculated amount of funds, to the sub-accounts of members of the business association, the investment gains are disbursed to the sub-accounts of the members of the business association in accordance with disbursement rules defined in the investment rules (act 405). For example, payment system account 303 and financial module 307 can interoperate to send amount 338 to payment system 304. Financial module 307 then credits each of the plurality of identified sub-accounts in accordance with disbursement rules 354. Accounts of non-members of business association 361 can be credited with their original invested amount. For example, financial module 307 can send credit 346 to credit balance 314 by amount 343 (the same amount that was previously debited for investment). On the other hand, members of business association 361 can be credited with an invested amount as well as any gain made on the invested amount. For example, financial module 307 can send credit 348 to credit balance 374 by amount 347. Amount 347 can be greater than amount 341.

Accordingly, in some embodiments, non-member sub-accounts are debited to provide funds for investing on behalf of members of a business association. In these embodiments, the disbursement rules define that non-member sub-accounts are credited back the amount of funds originally debited and that member sub-accounts are credited with any funds resulting from investment payments and/or gains.

In some embodiments, fund transfers associated with an investment, returning invested funds, and/or payments or gains on invested funds are also checked for compliance with transfer rules for a payment system, such as, for example, transfer rules 191. Fund transfers associated with an investment, returning invested funds, and/or payments or gains on invested funds can be rejected for failure to comply with transfer rules.

Figure 5B:
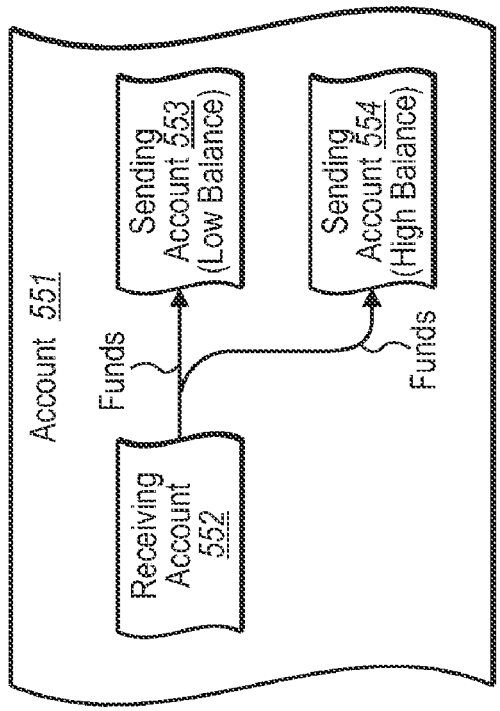
FIGS. 5A and 5B illustrate different configurations of payment account partitions that can be used within a payment system.
Figure 5A:
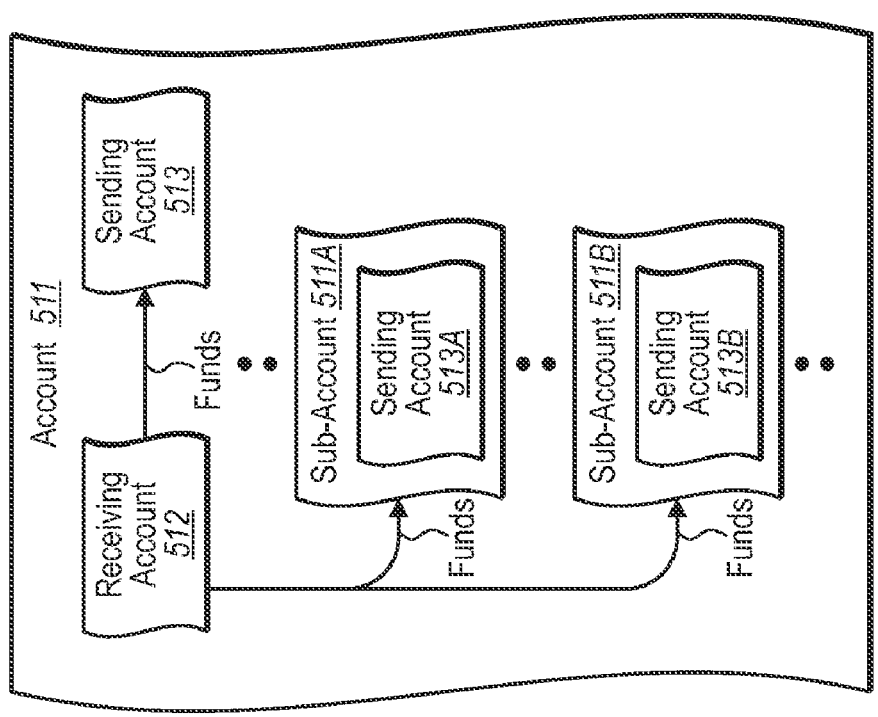

Payment system accounts can be partitioned into a variety of different configurations and can include more than two subaccounts. For example, a payment system account can be partitioned into a receiving account and sending account and further partitioned into one or more dependent sub-accounts (with other sending and/or receiving accounts). The dependent sub-accounts can be established for minor dependents, individuals within a grouped, fleet vehicles, etc. FIG. 5A depicts account 511 that has been partitioned into receiving account 512, sending account 513, and sub-accounts 511A and 511B. Sub-accounts 511A and 511B are further partitioned to include sending accounts 513A and 513B respectively.

Sub-accounts can also be partitioned based on purpose. For example, an account can be partitioned into a receiving account and plurality of sending accounts. Sending accounts can have "not-to-exceed" limits that indicate the size of payments that can be made from the sending account.

A low-balance sending account can be used for smaller payments and a high-balance sending account can be used for larger payments. For security purposes, additional restrictions can be placed on how funds are permitted to be transferred into the high-balance sending account. Further, more stringent authentication mechanisms can be used to verify identify prior to permitting a purchase from the high-balance sending accounts. FIG. 5B depicts account 551 that has been partitioned into receiving account 552, sending account 553 (low balance), and sending account 554 (high balance).

Embodiments of the invention include investing funds from and returning invested funds and payments and/or gains on invested funds to any type of partitioned sub-account.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a payment system including one or more processors and system memory, the payment system connected to one or more other computer systems, including a computer system at an external financial institution, via network communication, the payment system including an internal financial module and having a payment system account at the external financial institution, the payment system account being linked to the payment system, the payment system account providing an interface between internal accounts internal to the payment system and external accounts external to the payment system, the payment system managing internal accounts for a plurality of users of the payment management system, each internal account being partitioned into a plurality of different parts including at least a receiving sub-account and a sending sub-account, the financial module controlling the funds in the partitioned accounts, a method for providing an investment benefit to users that are members of the business association, the method comprising:

an act of identifying any sub-accounts having funds that are available for investment;

for the identified sub-accounts, an act of determining the balance of each sub-account;

an act of calculating an amount of funds available for investment based on the balances in each sub-account and in accordance with a risk strategy defined in investment rules that govern investing for the business association;

an act of the financial module and the payment system account interoperating to invest the calculated amount of funds on behalf of the business association in accordance with the risk strategy; and an act of the financial module and the payment system account interoperating to disburse any investment gains, resulting from investing the calculated amount of funds, to the sub-accounts of members of the business association, the investment gains disbursed to the sub-accounts of the members of the business association in accordance with disbursement rules defined in the investment rules.

2. The method as recited in claim 1, wherein an act of identifying any sub-accounts having funds that are available for investment comprises an act of identifying sub-accounts for account holders of the payment system that are not members of the business association.

3. The method as recited in claim 1, wherein an act of identifying any sub-accounts having funds that are available for investment comprises an act of identifying sub-accounts for account holders of the payment system that are members of the business association.

4. The method as recited in claim 3, wherein the act of the financial module and the payment system account interoperating to disburse any investment gains, resulting from investing the calculated amount of funds, to the sub-accounts of members of the business association comprises an act of disbursing investment gains, on funds invested from accounts having account holders that are not members of the business association, to accounts having account holders that are members of the business association.

5. The method as recited in claim 1, wherein the act of calculating an amount of funds available for investment based on the balances in each sub-account comprises an act of calculating the amounts of funds available for investment as a percentage of the balances in each sub-account.

6. The method as recited in claim 1, wherein the act of the financial module and the payment system account interoperating to invest the calculated amount of funds on behalf of the business association in accordance with the risk strategy comprises an act of transferring the calculated amounts of funds to the clearing bank along with investment options.

7. The method as recited in claim 6, wherein the act of transferring the calculated amounts of funds to the clearing bank along with investment options comprises an act of transferring the calculated amounts of funds to the clearing bank along with investment options, the investment options identifying financial assets selected from among: loans, stocks, bonds, commercial paper, and money market accounts.

8. The method as recited in claim 6, wherein the act of transferring the calculated amounts of funds to the clearing bank along with investment options comprises an act of transferring the calculated amounts of funds to the clearing bank along with investment options that identify investment accounts at the clearing bank.

9. The method as recited in claim 6, wherein the act of transferring the calculated amounts of funds to the clearing bank along with investment options comprises an act of transferring the calculated amounts of funds to the clearing bank along with that identify investment accounts external to the clearing bank.

10. The method as recited in claim 1, further comprising an act of receiving a payment from an interest bearing account at a periodic frequency defined for the interest bearing account.

11. The method as recited in claim 1, wherein the act of the financial module and the payment system account interoperating to disburse any investment gains, resulting from investing the calculated amount of funds, to the sub-accounts of members of the business association comprises an act of disbursing investment gains to members of the business association based on the percentage of funds within the payment system transferred to each member of the business association over a specified period of time.

12. A computer program product for use at a payment system, the payment system connected to one or more other computer systems, including a computer system at an external financial institution, via network communication, the payment system including an internal financial module and having a payment system account at the external financial institution, the payment system account being linked to the payment system, the payment system account providing an interface between internal accounts internal to the payment system and external accounts external to the payment system, the payment system managing internal accounts for a plurality of users of the payment management system, each internal account being partitioned into a plurality of different parts including at least a receiving sub-account and a sending sub-account, the financial module controlling the funds in the partitioned accounts, the computer program product for implementing a method for providing an investment benefit to users that are members of the business association, the computer program product comprising one or more computer storage media having stored thereon computer-executable instructions that, when executed at a processor, cause the payment system to perform the method, including the following:

identify any sub-accounts having funds that are available for investment;

for the identified sub-accounts, determine the balance of each sub-account;

calculate an amount of funds available for investment based on the balances in each sub-account and in accordance with a risk strategy defined in investment rules that govern investing for the business association;

invest the calculated amount of funds on behalf of the business association in accordance with the risk strategy; and disburse any investment gains, resulting from investing the calculated amount of funds, to the sub-accounts of members of the business association, the investment gains disbursed to the sub-accounts of the members of the business association in accordance with disbursement rules defined in the investment rules.

13. The computer program product as recited in claim 12, wherein computer-executable instructions that, when executed, cause the payment system to identify any sub-accounts having funds that are available for investment comprise computer-executable instructions that, when executed, cause the payment system to identifying sub-accounts for account holders of the payment system that are not members of the business association.

14. The computer program product as recited in claim 12, wherein computer-executable instructions that, when executed, cause the payment system to identify any sub-accounts having funds that are available for investment comprise computer-executable instructions that, when executed, cause the payment system to identifying sub-accounts for account holders of the payment system that are members of the business association.

15. The computer program product as recited in claim 14, wherein computer-executable instructions that, when executed, cause the payment system to disburse any investment gains, resulting from investing the calculated amount of funds, to the sub-accounts of members of the business association comprise computer-executable instructions that, when executed, cause the payment system to disburse investment gains, on funds invested from accounts having account holders that are not members of the business association, to accounts having account holders that are members of the business association.

16. The computer program product as recited in claim 12, wherein computer-executable instructions that, when executed, cause the payment system to calculate an amount of funds available for investment based on the balances in each sub-account comprise computer-executable instructions that, when executed, cause the payment system to calculate the amounts of funds available for investment as a percentage of the balances in each sub-account.

17. The computer program product as recited in claim 12, wherein computer-executable instructions that, when executed, cause the payment system to invest the calculated amount of funds on behalf of the business association in accordance with the risk strategy comprises computer-executable instructions that, when executed, cause the payment system to transfer the calculated amounts of funds to the clearing bank along with investment options.

18. The computer program product as recited in claim 17, wherein computer-executable instructions that, when executed, cause the payment system to transfer the calculated amounts of funds to the clearing bank along with investment options comprise computer-executable instructions that, when executed, cause the payment system to transfer the calculated amounts of funds to the clearing bank along with investment options, the investment options identifying financial assets selected from among: loans, stocks, bonds, commercial paper, and money market accounts.

19. The computer program product as recited in claim 12, wherein computer-executable instructions that, when executed, cause the payment system to disburse any investment gains, resulting from investing the calculated amount of funds, to the sub-accounts of members of the business association comprise computer-executable instructions that, when executed, cause the payment system to disburse investment gains to members of the business association based on the percentage of funds within the payment system transferred to each member of the business association over a specified period of time.

20. A system for investing funds from pre-paid payment accounts, the system comprising:
 a payment system, the payment system including:
  one or more processors;
  system memory; and
  one or more computer storage media having stored thereon computer executable instructions representing a financial module, the financial module configured to:
   identify any sub-accounts having funds that are available for investment;
   for the identified sub-accounts, determine the balance of each sub-account; and
   calculate an amount of funds available for investment based on the balances in each sub-account and in accordance with a risk strategy defined in investment rules that govern investing for the business association; and
 a clearing bank system, the clearing bank system including:
  one or more processors;
  system memory; and
  one or more computer storage media having stored thereon computer executable instructions representing a payment system account, the payment system account configured to:
   interact with accounts within the clearing bank system and accounts external to the clearing bank system to facilitate fund transfers to and from the payment system through interaction with the financial module and invest funds in investment accounts on behalf of the business association;
 wherein the financial module and the payment system account are configured to interoperate to invest the calculated amount of funds on behalf of the business association in accordance with the risk strategy; and
 wherein the financial module and the payment system account interoperate to disburse any investment gains, resulting from investing the calculated amount of funds, to the sub-accounts, the investment gains disbursed to the sub-accounts in accordance with disbursement rules defined in the investment rules.

* * * * *